2,824,538
Patented Feb. 25, 1958

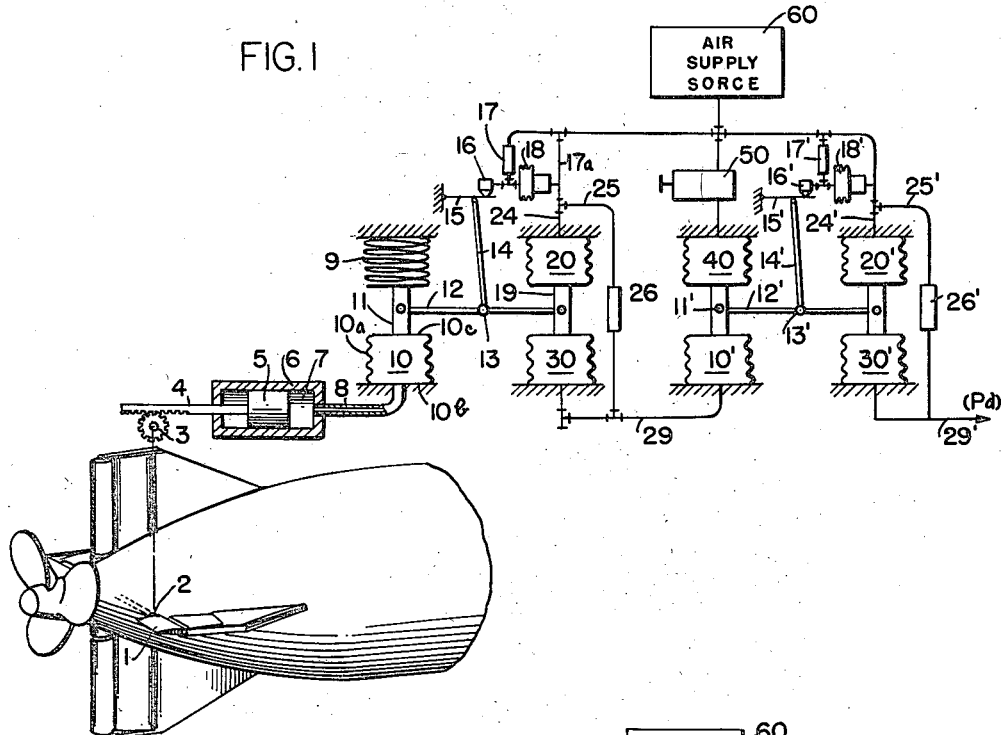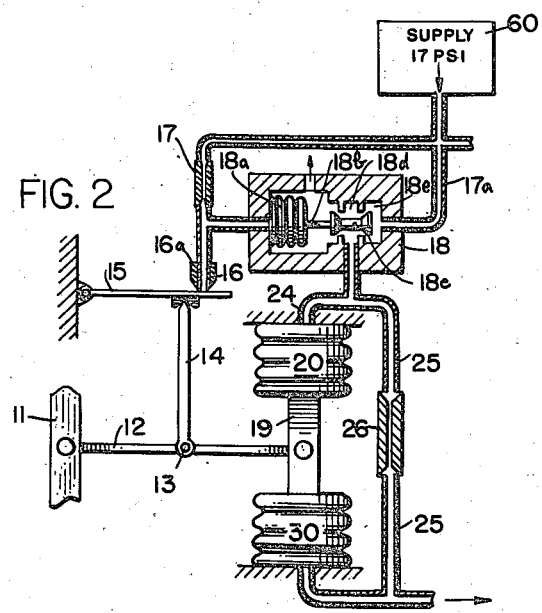

2,824,538
TORPEDO CONTROL SYSTEM

Wilfred H. Howe, Sharon, Mass., assignor, by mesne assignments, to the United States of America as represented by the Secretary of the Navy Application May 19, 1952, Serial No. 291,037

5 Claims. (Cl. 114—25)

This invention relates generally to a mechanical integrating device and, more particularly, relates to an integrating device in which the input and the output information of the device are in the form of fluid pressure variation, the output pressure variation being integral of the input pressure variation.

The specific embodiment of the invention to be hereinafter described has as its intended use the determination of depth of a torpedo from the double integration of the elevator position.

An object of the instant invention therefore is to provide a device for determining the depth of a torpedo from the position of the elevator thereof.

Another object of the instant invention is to provide a mechanical device of simple construction which will give the information of depth of the torpedo from the position of the elevator thereof.

Still another object of the instant invention is to provide a novel, simple, and effective integrating device.

Another object of the instant invention is to provide a novel device for integrating the motion of a given object in terms of the variation of fluid pressure.

Very broadly, the instant invention comprises a plurality of collapsible bellows devices filled with air or other compressible fluid, a conduit having a restriction communicating between some of the bellows devices, and a series of coupling or linking members cooperating with the bellows devices to form a servo-system capable of producing at the output of the device a pressure which is the integral of a given quantity which is fed into the device in the form of a mechanical movement.

Other features and objects of the instant invention will become more apparent upon making reference to the specifications and drawings wherein:

Figure 1 is a mechanical schematic diagram of the entire integrating system as used in conjunction with the torpedo control mechanism; and Figure 2 is a cross-sectional view of a part of an integrating system shown in Figure 1 in schematic form and includes a complete intgerating unit.

The integrating system shown in Figure 1 provides a variation in air pressure at the output end 29' which corresponds to the depth of the torpedo as obtained from a variation in air pressure in the input conduit 8 of the integrating system which varies in response to the movement of the elevator 1 of a torpedo, the details of which are not shown in the figure. This system is based on the premise that the attitude (that is the angle between the center line of a torpedo and a horizontal line) is the time integral of the elevator position, and the depth is the time integral of the attitude.

The position of elevator 1 of a torpedo is controlled by a shaft 2 which may be connected to an electrical motor or other suitable motion device not shown in the figure. The motion of shaft 2 is coupled to a pinion gear 3 and a rack 4 to linearly displace piston 5 of a pressure chamber 6 to produce a variation of air pressure in the confined chamber 7 thereof in accordance with the movement of elevator 1. Communicating with chamber 7, whose pressure and volume vary with the movement of piston 5, is an input conduit 8 which communicates with the inner chamber of a spring loaded bellows 10. Bellows 10 as well as the other bellows there shown comprises a side collapsible wall member 10a, a horizontal fixed face member 10b, and a movable horizontal face member 10c forming the confines of a chamber therein. The top movable face 10c of bellows 10 is connected to a rod member 11 which engages spring 9 at the other end thereof to force the collapsible side wall members of bellows 10 into the collapsed position. Connected to the mid-portion of rod 11 is a lever mechanism comprising a horizontal bar 12 pivoted at point 13 about a vertical bar 14. An upward displacement of vertical bar 14 operates a pilot valve 16 and pneumatic relay 18 which cause a similar pressure variation in bellows 20 in the output of pneumatic relay 18. Pneumatic relay 18 has as its purpose the amplification of the variation of the air pressure fed to the input thereof. A source of air under pressure is fed to pneumatic relay 18 through a pressure dropping device 17 and also by a different route through a conduit 17a, the reasons for which will be described in more detail in connection with the Figure 2. The vertically movable face portion of bellows 20 is coupled to the vertically movable face portion of a second bellows 30 through a rod member 19. Rod member 19 is connected to the end of horizontal lever 12 which is opposite rod 11. A pressure dropping device 26 is coupled between the input pressure line 24 to bellows 20 and bellows 30.

The operation of part of the system thus far described in Figure 1 is as follows:

If shaft 2 is moved in clockwise direction so as to move elevator 1 to a greater angle of inclination, rack 4 is moved to the right thereby causing piston 5 to decrease the volume of chamber 7 and increase the pressure of the air therein. This pressure variation is communicated to bellows 10 and causes expansion of the walls thereof to raise the upper face thereof against the pressure of spring 9 to lift rod 11. The upward movement of rod 11 is coupled through horizontal lever 12 to vertical lever 14 to partially close the pilot valve 16 thereby increasing the pressure to pneumatic relay 18. The change in air pressure at the input of pneumatic relay 18 caused by this movement of elevator 1 is amplified by pneumatic relay 18 thereby causing an increase in the air pressure in bellows 20. The output pressure variation of relay 18 is fed to a pneumatic restriction 26. Due to this pneumatic restriction 26, the output pressure of relay 18 passes rather slowly to the input of bellows 30 so that immediate response may be considered as that of bellows 20. On this basis, when lever 12 is moved upward, the right end of lever 12 moves downward about pivot 13 due to the downward movement of connecting rod 19 connected to the movable face of bellows 20 thereby tending to keep the vertical position of lever 14 in its original position. Thus, neglecting the delayed response of bellows 30, the pressure at the output of pneumatic relay 18 would be maintained in proportion to the input motion.

As previously mentioned, a combination of bellows 20 and 30 and the restriction 26 operates to produce an integrating effect. The position of connecting rod 19 between the two bellows 20—30 is proportional to the difference between the air pressure in bellows 20 and 30. The pneumatic servomechanism shown in Figure 1 operates continuously to cause the position of rod 19 to correspond to the position of rod 11. There is thus maintained a differential pressure between the bellows 20—30 proportional to the input movement of rod 11. Since the rate of flow through pneumatic restriction 26 is proportional to the differential pressure, this flow rate, in turn, is thus maintained at a value proportion to the input motion of rod 11. The pressure in bellows 30 is, of course, proportional to the total quantity of air in this and the associated bellows supplied through the restriction 26. This total quantity of air is the time integral of the air flow through pneumatic restriction 26, and hence, the air pressure in bellows 30 is the integral in the input pressure in integral conduit 8.

The air of bellows 30 communicates by means of a conduit 29 with a second series of bellows and levers 10', 12', 14', 20', 26', 30', etc. which produces an air pressure in bellows 30' which is the integral of the air pressure fed to bellows 10'. (It should be noted that the prime members operate in a manner similar to the elements which are indicated by the unprimed numbers just described, and a repetition of the function of these primed elements is thus thought unnecessary. The only major difference in this second integrating unit is the replacement of spring 9 by bellows 40 whose pressure is adjusted by means of a reducing valve 50 which communicates with the main supply source. In other words, the reducing valve 50 and associated bellows 40 simply provides in effect an adjustable loading to the second system. The reducing valve is a conventional unit which supplies an air pressure between zero and supply pressure to bellows 40 thereby causing this bellows to exert a controllable constant force in the second integrating system.

For some purposes it may be desirable to utilize the variation in pressure in the output conduit 29' communicating with bellows 30' to control the position of torpedo elevator 1.

Reference should now be made to Figure 2 which shows a cross-sectional view of one of the integrating units shown in Figure 1 in order to more clearly disclose the details of the pilot valve 16 (or 16') and pneumatic relay 18 (or 18'). Pilot valve 16 comprises a nozzle 16a which communicates with the atmosphere through an opening between it and a baffle plate 15 which encloses the opening of nozzle 16a to a degree dependent upon the vertical position of lever 14. The main supply 60 produces an air pressure of 17 lbs. per square inch. The main air supply source 60 communicates with nozzle 16a and the relay 18 through a restriction 17 sized to pass, for example, 1000 cc./min. at 15 lbs. pressure drop. The nozzle-baffle combination produces a second pneumatic restriction whose effective pneumatic resistance to air flow varies with the relative position of baffle and nozzle. The actual working range of this system shown in Figure 2 is between 2 and 3 lbs. air pressure behind the nozzle. About 6/10,000 inch motion of the baffle with respect to the nozzle is required to change the air pressure from 2 to 3 lbs./sq. in. This pressure behind the nozzle is applied to the bellows 18a connected to nozzle 16a and pneumatic restriction 17 and a double valve member 18c which is connected to the movable face of bellows 18a so as to move in response to the changes of pressure therein. Movement of double valve member 18c controls the air pressure in an annular chamber 18d which communicates to the atmosphere at one end of the chamber through one end of the double valve 18c and communicates at the other end thereof with a chamber 18e which connects directly through conduit 17a to the main supply source 60. The pressure variation of annular chamber 18d is communicated to bellows 20.

The pneumatic relay is set so that with 3 lbs. pressure, the bellows 18a is expanded, and the double valve plunger 18c is pushed into the extreme right of its possible travel thereby causing the air in chamber 18e to communicate with annular chamber 18d and shutting off the communication of chamber 18d with the atmosphere. With 2 lbs. pressure in the bellows, the double valve member 18c moves about one-hundredth of an inch to the extreme left position thereby closing the opening between chamber 18d to the atmosphere through the left portion of valve member 18c. It is obvious that when the double valve plunger is at the right end of this travel, the opening between the chamber 18e, which is connected directly to the supply source and output of annular chamber 18d, is practically wide open; and the bleed path to the atmosphere through the left part of valve 18c is practically closed thereby producing a pressure approximately equal to the supply air pressure in the output of chamber 18d. On the other hand, when the valve member 18c is at the left of its travel, the valve portion between chamber 18d and the annular chamber 18d is practically closed, and the vent of bleed path to the atmosphere is practically open thereby producing an output pressure near atmospheric. With the valve plunger in extreme right and extreme left position, of course, the pressure in annular chamber 18d is somewhere between the supply source and the atmosphere. That is to say, there is a gradual increase in pressure as double valve plunger 18c moves from its extreme left position to the extreme right position. Thus, the input pressure change from 2 to 3 lbs. results in output pressure of nearly 0 to 17 lbs.

Although the preferred embodiment of the instant invention utilizes a gaseous medium, such as air, as the pressure indicating element, it should be understood that, if desired, other fluids could also be used.

It should be understood that many other modifications of the specific embodiments above described may be made without deviating from the broader aspects of the invention.

I claim:

1. A mechanical integrating unit comprising a first and second collapsible, hollow, bellows device, each having a compressible fluid therein, the pressure of which determines the degree of collapse thereof, a first means for varying the fluid pressure in said first bellows device in proportion to a first given quantity, and a conduit means filled with a fluid including a narrow restriction in the walls thereof communicating with the said fluid-filled bellows devices whereby the rate of flow of fluid from first bellows devices to said second bellows device is proportional to the difference of fluid pressure therebetween, the fluid pressure in said second bellows device being the integral of said given quantity, a first mechanical coupling member between the collapsible wall member of said first and second bellows devices, where the position thereof is a function of the difference in fluid pressure in said bellows devices, a third collapsible bellows device whose degree of collapse is directly proportional to said first given quantity, said first means including a pilot valve member which varies the fluid pressure in said first bellows device proportional to the position thereof, and a mechanical linkage connected to said first coupling member, to said pilot valve, and to the collapsible wall member of said third bellows device for moving said pilot valve in response to a movement of said third bellows device and said coupling member, said first means including a first hollow cylinder having a movable piston therein providing a variable volume chamber therein whose pressure is proportional to the position of said piston, a compressible fluid in said chamber, means coupling said chamber to said third hollow bellows device to expand the walls thereof in proportion to the position of said piston, control means varying the position of said piston in proportion to said first given quantity.

2. The combination of claim 1 characterized further by said control means including a rack gear coupled to the end of said piston and a pinion gear, an elevator control for a torpedo including a rotatable shaft for controlling the angular position thereof, means coupling said rotatable shaft to said pinion gear whereby the fluid pressure in said second bellows device is the attitude of the torpedo controlled by said elevator.

3. The combination of claims 2 characterized further by a second integrating unit similar to the latter integrating unit coupled to the said second hollow bellows device for determining the depth of the torpedo controlled by said elevator.

4. The combination of claim 1 characterized further by said mechanical linkage including a first generally vertical lever for moving said pilot valve in response to a vertical component of motion, and a second generally horizontal lever pivotally hinged in the center portion thereof to said first lever, the ends of said second lever connected respectively for vertical movement by said first coupling member and the movable walls of said third bellows device.

5. The combination comprising an elevator control surface for a torpedo, a rotatable control shaft for controlling the angular position thereof, a bellows operated mechanical-integration device coupled to said elevator control shaft for obtaining a variation of fluid pressure corresponding to the double integration of the motion of said control shaft to determine the depth of said torpedo.

No references cited.